United States Patent
Dong

(10) Patent No.: US 12,402,172 B2
(45) Date of Patent: Aug. 26, 2025

(54) RANDOM ACCESS METHOD, APPARATUS AND SYSTEM, AND STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 547 days.

(21) Appl. No.: 17/624,221

(22) PCT Filed: Jul. 3, 2019

(86) PCT No.: PCT/CN2019/094591
§ 371 (c)(1),
(2) Date: Dec. 30, 2021

(87) PCT Pub. No.: WO2021/000295
PCT Pub. Date: Jan. 7, 2021

(65) Prior Publication Data
US 2022/0353917 A1 Nov. 3, 2022

(51) Int. Cl.
*H04W 74/08* (2024.01)
*H04W 74/0833* (2024.01)

(52) U.S. Cl.
CPC .............. *H04W 74/0833* (2013.01)

(58) Field of Classification Search
CPC ......... H04W 74/0833; H04W 36/0077; H04W 76/27
See application file for complete search history.

(56) References Cited

U.S. PATENT DOCUMENTS

| 12,052,770 B2 * | 7/2024 | Chai ................. H04W 72/1263 |
| 2010/0165943 A1 * | 7/2010 | Kato ................. H04W 74/0833 370/329 |

(Continued)

FOREIGN PATENT DOCUMENTS

| CN | 108377558 A | 8/2018 |
| CN | 109089303 A | 12/2018 |

(Continued)

OTHER PUBLICATIONS

International Search Report of PCT/CN2019/094591 dated Mar. 25, 2020 with English translation, (5p).

(Continued)

*Primary Examiner* — John D Blanton
(74) *Attorney, Agent, or Firm* — Arch & Lake LLP

(57) ABSTRACT

The present disclosure provides a random access method, apparatus and system, and a storage medium. The method comprises: a terminal sending, according to a system message sent by an access network device, a preamble in a random access message on a first time-frequency resource, and a payload in the random access message on a second time-frequency resource; the terminal acquiring a random access response message sent by the access network device; and in response to a first terminal identifier in the random access response message being the same as a second terminal identifier of the terminal, determining, according to whether the random access response message comprises a C-RNTI, whether to send an acknowledgement message to the access network device, wherein the acknowledgement message informs the access network device that the terminal has received the C-RNTI.

4 Claims, 7 Drawing Sheets

(56) References Cited

U.S. PATENT DOCUMENTS

| | | | |
|---|---|---|---|
| 2015/0326995 A1 | 11/2015 | Li et al. | |
| 2019/0246434 A1 | 8/2019 | Tang et al. | |
| 2020/0107372 A1* | 4/2020 | Agiwal | H04W 80/02 |
| 2020/0252973 A1* | 8/2020 | Zhang | H04W 36/0079 |
| 2020/0314913 A1* | 10/2020 | Rastegardoost | H04W 74/04 |
| 2020/0344812 A1* | 10/2020 | Agiwal | H04W 74/0891 |
| 2021/0120581 A1* | 4/2021 | Kim | H04W 76/27 |
| 2021/0243814 A1* | 8/2021 | Zhang | H04W 74/0833 |
| 2021/0329703 A1* | 10/2021 | Yang | H04B 17/318 |
| 2021/0378028 A1* | 12/2021 | Wu | H04W 74/0833 |
| 2022/0046717 A1* | 2/2022 | Zhang | H04L 1/1861 |
| 2022/0210839 A1* | 6/2022 | Rune | H04W 36/0077 |
| 2022/0295357 A1* | 9/2022 | Jang | H04W 74/0838 |
| 2022/0353917 A1* | 11/2022 | Dong | H04W 74/0833 |
| 2023/0284264 A1* | 9/2023 | Kim | H04L 1/0003 370/329 |

FOREIGN PATENT DOCUMENTS

| | | | |
|---|---|---|---|
| CN | 109495222 A | 3/2019 | |
| CN | 109863816 A | 6/2019 | |
| WO | 2018102966 A1 | 6/2018 | |
| WO | 2018141265 A1 | 8/2018 | |
| WO | WO-2021000295 A1 * | 1/2021 | H04W 74/0833 |

OTHER PUBLICATIONS

Spreadtrum Communications, "Considerations on 2-step RACH procedure", 3GPP TSG RAN WG1 Meeting #97, R1-1906367, Apr. 30, 2019, (8p).

Samsung, "2-Step RA: MsgA Aspects", 3GPP TSG-RAN2 106, R2-1905719, Apr. 30, 2019, (5p).

Chinese Patent Notice of Allowance issued in Application No. 201980001271.X dated Sep. 19, 2022, (4p).

Qualcomm Inc., "Update to MAC Test case—Random access procedure Successful C-RNTI BasedPreamble selected by MAC itself", 3GPP TSG RAN WG5#79, R5-182479, Busan, South Korea, May 21-25, 2018, (15p).

* cited by examiner

RANDOM ACCESS METHOD, APPARATUS AND SYSTEM, AND STORAGE MEDIUM

CROSS-REFERENCE TO RELATED APPLICATION

The present application is a national phase of International Application No. PCT/CN2019/094591, filed on Jul. 3, 2019, the entire contents of which are hereby incorporated by reference for all purposes.

TECHNICAL FIELD

The present disclosure relates to the field of communication technology, and in particular to a random access method, apparatus, system and storage medium.

BACKGROUND

A terminal may be connected to an access network device in a random access manner in order to communicate with the network via the access network device.

In related art, the access network device broadcasts a system message to the terminal. The terminal sends a preamble (message one, i.e., msg1) to the access network device on a first time-frequency resource according to the system message. The access network device sends a message two (msg2) to the terminal, which includes an index number of the preamble listened to by the access network device, indication information and a temporary Cell Radio Network Temporary Identifier (TC-RNTI). The indication information is used for indicating a second time-frequency resource on which a message three (msg3) is sent. If the index number in msg2 indicates the preamble that was sent by the terminal, the terminal scrambles the msg3 using the TC-RNTI and sends the scrambled msg3 on the second time-frequency resource. The access network device allocates a permanent C-RNTI to the terminal and sends a message four (msg4) carrying the permanent C-RNTI to the terminal. The terminal converts the TC-RNTI into the permanent C-RNTI and sends an acknowledgement message to the access network device when it determines that the random access is successful according to the msg4.

SUMMARY

The present disclosure provides a random access method, apparatus, system and storage medium.

According to an aspect of the present disclosure, a random access method is provided. The random access method includes: sending, according to a system message sent by an access network device, by a terminal, a preamble in a random access message on a first time-frequency resource and a payload in the random access message on a second time-frequency resource; acquiring, by the terminal, a random access response message fed back by the access network device; and determining, in response to a first terminal identifier in the random access response message being equal to a second terminal identifier of the terminal, whether to send an acknowledgement message to the access network device depending on whether the random access response message includes a Cell Radio Network Temporary Identifier (C-RNTI), where the acknowledgement message is used for informing the access network device that the terminal has received the C-RNTI.

According to an aspect of the present disclosure, a random access method is provided. The random access method includes: sending, by an access network device, a system message to a terminal, where the system message is used for indicating the terminal to send a preamble in a random access message on a first time-frequency resource and to send a payload in the random access message on a second time-frequency resource; receiving, by the access network device, the preamble on the first time-frequency resource, and receiving the payload on the second time-frequency resource; and generating, by the access network device, a random access response message according to whether the payload carries a Cell Radio Network Temporary Identifier (C-RNTI), where the random access response message includes a first terminal identifier, or the random access response message includes the first terminal identifier and the C-RNTI.

According to an aspect of the present disclosure, a random access apparatus is provided, which is applied to a terminal and includes: a sending module, configured to send, according to a system message sent by an access network device, a preamble in a random access message on a first time-frequency resource and a payload in the random access message on a second time-frequency resource; an acquisition module, configured to acquire a random access response message fed back by the access network device; and a determination module, configured to determine, in response to a first terminal identifier in the random access response message being equal to a second terminal identifier of the terminal, whether to send an acknowledgement message to the access network device depending on whether the random access response message includes a Cell Radio Network Temporary Identifier (C-RNTI), wherein the acknowledgement message is used for informing the access network device that the terminal has received the C-RNTI.

According to an aspect of the present disclosure, a random access apparatus is provided, which is applied to an access network device and includes: a sending module, configured to send a system message to a terminal, where the system message is used for indicating the terminal to send a preamble in a random access message on a first time-frequency resource and to send a payload in the random access message on a second time-frequency resource; a receiving module, configured to receive the preamble on the first time-frequency resource and the payload on the second time-frequency resource; and a generation module, configured to generate a random access response message according to whether the payload carries a Cell Radio Network Temporary Identifier (C-RNTI), where the random access response message includes a first terminal identifier, or the random access response message includes the first terminal identifier and the C-RNTI.

According to an aspect of the present disclosure, a terminal is provided. The terminal includes one or more processors; and a memory for storing one or more executable instructions of the one or more processors, where the one or more processors are configured to: send, according to a system message sent by an access network device, a preamble in a random access message on a first time-frequency resource and a payload in the random access message on a second time-frequency resource; acquire a random access response message fed back by the access network device; and determine, in response to a first terminal identifier in the random access response message being equal to a second terminal identifier of the terminal, whether to send an acknowledgement message to the access network device depending on whether the random access response message includes a Cell Radio Network Temporary Identifier (C-RNTI), wherein the acknowledgement message is used for informing the access network device that the terminal has received the C-RNTI.

According to an aspect of the present disclosure, an access network device is provided. The access network device includes one or more processors; and a memory for storing one or more executable instructions of the one or more processors, where the one or more processors are configured to: send a system message to a terminal, where the system message is used for indicating the terminal to send a preamble in a random access message on a first time-frequency resource and to send a payload in the random access message on a second time-frequency resource; receive the preamble on the first time-frequency resource and the payload on the second time-frequency resource; and generate a random access response message according to whether the payload carries a Cell Radio Network Temporary Identifier (C-RNTI), where the random access response message includes a first terminal identifier, or the random access response message includes the first terminal identifier and the C-RNTI.

According to an aspect of the present disclosure, a random access system is provided, which includes the random access apparatus applied to a terminal as described in above embodiments and the random access apparatus applied to an access network device as described in above embodiments, or includes the terminal as described in above embodiments and the access network device as described in above embodiments.

According to an aspect of the present disclosure, a non-transitory computer readable storage medium is provided. The storage medium stores at least one instruction, at least one segment of a program, a code set or an instruction set. The at least one instruction, the at least one segment of a program, the code set or the instruction set is loaded and executed by a processor to implement the random access method applied to a terminal as described in above embodiments. Alternatively, The at least one instruction, the at least one segment of a program, the code set or the instruction set is loaded and executed by a processor to implement the random access method applied to an access network device as described in above embodiments.

BRIEF DESCRIPTION OF THE DRAWINGS

The accompanying drawings herein are incorporated into and form part of the specification of the present disclosure, illustrate embodiments consistent with the present disclosure, and are used in conjunction with the specification to explain the principles of the present disclosure.

DETAILED DESCRIPTION

Embodiments will be described in detail herein, examples of which are illustrated in the accompanying drawings. In the following description of the accompanying drawings, the same numerals in the different accompanying drawings indicate the same or similar elements unless otherwise indicated. The implementation manners described in the following embodiments do not represent all embodiments that are consistent with the present disclosure. Rather, they are only examples of devices and methods that are consistent with some aspects of the present disclosure, as detailed in the appended claims.

Figure 1:
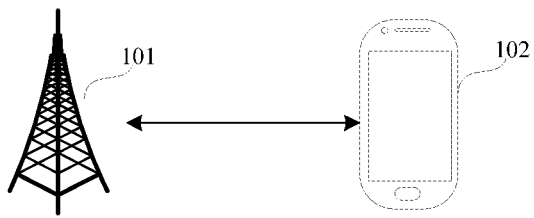
FIG. 1 is a schematic diagram of the implementation environment involved in embodiments of the present disclosure.

FIG. 1 illustrates a structural schematic diagram of a mobile communication system provided by an embodiment of the present disclosure. The mobile communication system may be a 5G system, also known as a New Radio (NR) system, or a New Air Port system. The mobile communication system includes an access network device 101 and a terminal 102.

The access network device 101 may be a base station. The specific implementation of the access network device 101 is not limited by the embodiments of the present application. Optionally, the access network device 101 may also be a home base station (i.e., Home eNB or HeNB), a relay, or a PicoCell, etc.

A radio connection is established between the access network device 101 and the terminal 102 via a radio interface. Optionally, the radio interface is the radio interface based on a fifth-generation (5G) mobile communication network technology standard, for example, the radio interface is a New Radio (NR). Optionally, the radio interface may also be a radio interface based on 5G-based next-generation mobile communication network technology standard.

The terminal 102 may be a device that provides voice and/or data connectivity to a user. The terminal 102 may communicate with one or more core networks via a Radio Access Network (RAN) and the terminal 102 may be a mobile terminal, such as a mobile phone (or "cellular" phone) or a computer with a mobile terminal. In some embodiments, the terminal 102 may be a portable, pocket-sized, hand-held, computer-built or vehicle-mounted mobile device. In some embodiments, the terminal 102 may be a Subscriber Unit, Subscriber Station, Mobile Station, Mobile, Remote Station, Access Point, Remote Terminal, Access Terminal, User Terminal, User Agent, User Device, or User Equipment.

It should be noted that in the mobile communication system shown in FIG. 1, a plurality of access network devices 101 and/or a plurality of terminals 102 may be included, and FIG. 1 is illustrated by showing one access network device 101 and one terminal 102 as an example, without limitation in this embodiment.

Figure 2:
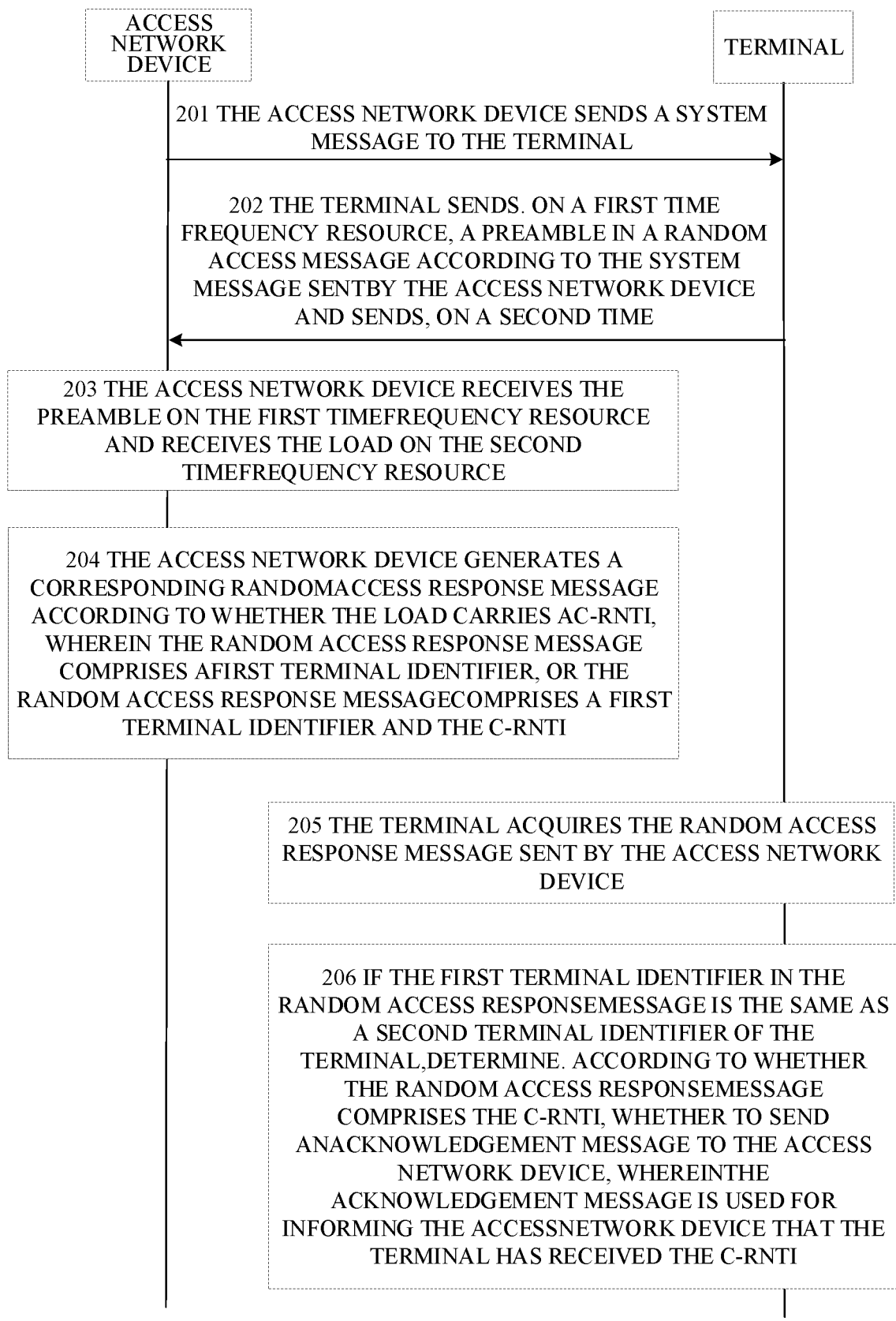
FIG. 2 is a flow chart of a random access method illustrated according to an embodiment.

FIG. 2 is a flow chart illustrating a random access method according to an embodiment, which is applied in the implementation environment shown in FIG. 1. As shown in FIG. 2, the random access method includes the following steps.

At step 201, the access network device sends a system message to the terminal.

At step 202, the terminal sends a preamble in a random access message on a first time-frequency resource and a payload in the random access message on a second time-frequency resource according to the system message sent by the access network device.

At step 203, the access network device receives the preamble on the first time-frequency resource and the payload on the second time-frequency resource.

At step 204, the access network device generates a random access response message according to whether the payload carries a C-RNTI. The random access response message includes a first terminal identifier, or the random access response message includes the first terminal identifier and the C-RNTI.

At step 205, the terminal acquires the random access response message fed back by the access network device.

At step 206, in response to the first terminal identifier in the random access response message being equal to a second terminal identifier of the terminal, the terminal determines whether to send an acknowledgement message to the access network device depending on whether the random access response message includes the C-RNTI. The acknowledgement message is used for informing the access network device that the terminal has received the C-RNTI.

Here, steps 201 and 203-204 can be implemented separately as access network device side implementations and steps 202 and 205-206 can be implemented separately as terminal side implementations.

In summary, the present disclosure provides a random access method that enables merging of messages sent by a terminal since the terminal may send, based on a system message, a preamble in the random access message on a first time-frequency resource and a payload in the random access message on a second time-frequency resource. Then, the terminal may receive a random access response message and upon determining that a first terminal identifier in the random access response message is the same as a second terminal identifier of the terminal, determine whether to send an acknowledgement message based on whether the C-RNTI is included in the random access response message, thereby allowing the integrity of the process of random access to be ensured.

Figure 3:
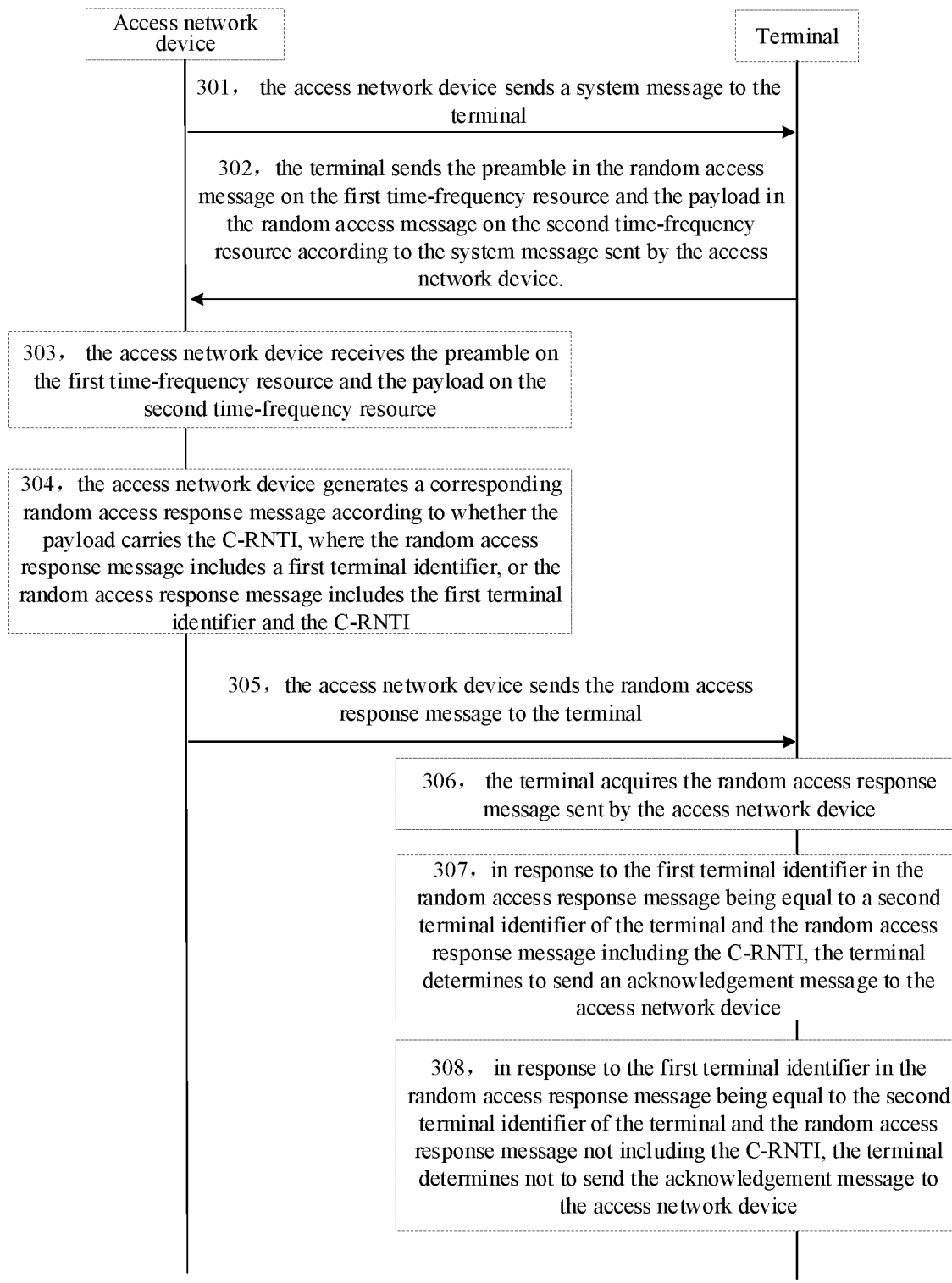
FIG. 3 is a flow chart of a random access method illustrated according to an embodiment.

FIG. 3 is a flow diagram of a random access method illustrated according to another embodiment, which is applied to the implementation environment shown in FIG. 1. As shown in FIG. 3, the random access method includes the following steps.

At step 301, the access network device sends a system message to the terminal.

In this embodiment, the system message is used for instructing the terminal to send a preamble in a random access message on a first time-frequency resource and to send a payload in the random access message on a second time-frequency resource. The contents of the system message are first described below.

In an optional embodiment, the system message may include a Synchronization Signal Block (SSB) that includes a Primary Synchronization Signal (PSS) and a Secondary Synchronization Signal (SSS), the PSS and SSS being used for enabling downlink synchronization of the terminal with the access network device.

In an optional embodiment, the system message may include the first resource indication information and the second resource indication information. The first resource indication information is used for indicating to the terminal the first time-frequency resource for sending the preamble in the random access message, and the second resource indication information is used for indicating to the terminal the second time-frequency resource for sending the payload in the random access message.

The access network device may determine the first time-frequency resource and the second time-frequency resource according to a predetermined algorithm. The frequency domain resource in the first time-frequency resource and the frequency domain resource in the second time-frequency resource may be the same or different, without limitation in this embodiment. The time domain resource in the first time-frequency resource and the time domain resource in the second time-frequency resource are different. In an optional embodiment, there is a discontinuity between the time domain resource in the first time-frequency resource and the time domain resource in the second time-frequency resource. That is, the preamble and the payload in the random access message are sent separately. In particular, the time domain resource in the second time-frequency resource follows the time domain resource in the first time-frequency resource, i.e., the terminal sends the preamble in the random access message first and then sends the payload in the random access message.

In this embodiment, the random access message is used to allow the terminal to randomly access the network. Here, the random access message may include a preamble and a payload. In some embodiments, the random access message may also include other information or not, which is not limited in this embodiment.

The preamble is used to identify the terminal during random access. If the preamble of the access network device is not stored in the terminal, the access network device may also carry the preamble in the system message to the terminal, i.e., the system message further includes the preamble. If the preamble of the access network device is stored in the terminal, the preamble may not be carried in the system message. In some embodiments, when the terminal accesses the access network device via the competition mechanism, the system message carries a preamble sequence, each preamble being a preamble used by the terminal for accessing the network based on the competition mechanism.

A load, which may also be called a payload, is used for sending information related to Radio Resource Control (RRC). In different application scenarios, the content of the payload may be different. For example, when the terminal is in a state of waiting for uplink synchronization or in a state of waiting to send the uplink scheduling signaling request, the payload may include an RRC Connection Resume/re-establishment, which may contain the reason (establishmentCause) for the creation of the RRC Connection Resume/re-establishment. The reason may be that the terminal is in the state of waiting for uplink synchronization (also called uplink falling-out of synchronism) and needs to be reconnected to the network, or the reason may be when there is data to be transmitted at the upper layer and the data size is known, the network side is not configured with uplink transmission resources and may contain C-RNTI allocated to the terminal on the network side. For another example, when the terminal is in an initial random access state, the payload may include an RRC Connection Request, which may contain an Initial UE Identity and the reason for the creation of the RRC Connection Request. The reason may include emergency, highPriorityAccess, mt-Access, mo-Signalling, mo-Data, mo-VoiceCall, mo-VideoCall, mo-SMS, mps-PriorityAccess, or mcs-PriorityAccess.

In an optional implementation, the system message may include the first Modulation and Coding Scheme (MC S)

information and the second MCS information. The first MCS information is used for indicating the transmission rate of the preamble and the second MCS message is used for indicating the transmission rate of the payload. Optionally, the first MCS information and the second MCS information may be indexes for indicating a group of transmission parameters in a rate table. Here, the value of the first MCS information and the value of the second MCS information may be the same or different, without limitation in this embodiment.

At step 302, the terminal sends the preamble in the random access message on the first time-frequency resource and the payload in the random access message on the second time-frequency resource according to the system message sent by the access network device.

The terminal may read the first resource indication information from the system message and determine the first time-frequency resource based on the first resource indication information. The terminal may also determine the preamble to be sent and send the preamble on the first time-frequency resource. In an optional embodiment, since the system message further includes the first MCS information, the terminal may send the preamble on the first time-frequency resource based on the first MCS information. That is, the terminal may look up the corresponding group of transmission parameters in the rate table based on the first MCS information and then send the preamble on the first time-frequency resource based on the transmission parameters.

The terminal may read the second resource indication information from the system message and determine the second time-frequency resource based on the second resource indication information. The terminal may also generate the payload in the random access message and send the payload on the second time-frequency resource. The manner in which the payload in the random access message is sent is described below.

In this embodiment, the terminal determines whether the C-RNTI has been stored in the terminal according to a connection status. In response to the C-RNTI having been stored in the terminal, the terminal generates a first payload including the C-RNTI and sends the first payload in the random access message on the second time-frequency resource, where the first payload is used for informing the access network device that there is no need to allocate the C-RNTI to the terminal this time. In response to the C-RNTI not being stored in the terminal, the terminal generates a second payload excluding the C-RNTI and sends the second payload in the random access message on the second time-frequency resource, where the second payload is used for informing the access network device to allocate C-RNTI to the terminal this time.

The terminal being in a radio resource control connection (RRC_connected) status or a radio resource control inactive (RRC_inactive) status indicates that the terminal has previously been connected to the access network device in an RRC connection, thus the terminal has stored the C-RNTI allocated by the access network device. Since the terminal will use the C-RNTI for subsequent interactions with the access network device, when the C-RNTI is already stored in the terminal, the terminal may carry the C-RNTI in the first payload and send it to the access network device. In this way, when the access network device determines that the C-RNTI is included in the first payload, it does not need to re-allocate the C-RNTI to the terminal, and then interact with the terminal based on this C-RNTI.

The terminal being in a radio resource control idle (RRC_idle) status or an initial access status indicates that the terminal has not previously made an RRC connection to the access network device, thus the terminal does not store the C-RNTI allocated by the access network device and the terminal generates the second payload that does not include the C-RNTI. In this way, the access network device, when determining that the second payload does not include the C-RNTI, needs to allocate the C-RNTI to the terminal, and subsequently interacts with the terminal based on that allocated C-RNTI.

After the terminal generates the payload (i.e., the first payload or the second payload), the terminal may calculate a Random Access-Radio Network Temporary Identifier (RA-RNTI) according to the first time-frequency resource, scramble the payload in the access message based on the RA-RNTI and send the scrambled payload on the second time-frequency resource.

In an optional embodiment, the system message further includes the second MCS information, so that the terminal may send the scrambled payload on the second time-frequency resource based on the second MCS information. That is, the terminal may look up the corresponding group of transmission parameters in the rate table according to the second MCS information and send the scrambled payload on the second time-frequency resource according to the transmission parameters.

At step 303, the access network device receives the preamble on the first time-frequency resource and the payload on the second time-frequency resource.

In an optional embodiment, in case the terminal sends the preamble on the first time-frequency resource based on the first MCS information, the access network device may receive the preamble on the first time-frequency resource based on the first MCS information. That is, the access network device may look up the corresponding group of transmission parameters in the rate table based on the first MCS information, and then receive the preamble on the first time-frequency resource based on the transmission parameters.

In an optional embodiment, in case the terminal sends the scrambled payload on the second time-frequency resource based on the second MCS information, the access network device may receive the scrambled payload on the second time-frequency resource based on the second MCS information. That is, the access network device may look up the corresponding group of transmission parameters in the rate table based on the second MCS information, and then receive the scrambled payload on the second time-frequency resource based on the transmission parameters.

After receiving the scrambled payload, the access network device calculates the RA-RNTI based on the first time-frequency resource, and then descrambles the scrambled payload based on the RA-RNTI to obtain the payload in the access network message, which is either the first payload or the second payload.

At step 304, the access network device generates a random access response message according to whether the payload carries the C-RNTI, where the random access response message includes a first terminal identifier, or the random access response message includes the first terminal identifier and the C-RNTI.

After the access network device receives the preamble and the payload from the terminal, the access network device may determine whether the payload is the first payload or the second payload. In response to the payload being the second payload that does not include the C-RNTI, the access network device allocates a C-RNTI to the terminal and generates a first random access response message that includes the C-RNTI. The first random access response message serves as a random access response message. In response to the payload being the first payload that includes the C-RNTI, the access network device generates a second random access response message that does not include the C-RNTI. The second random access response message serves as a random access response message.

It should be noted that the access network device may also obtain the first terminal identifier and UL Grant (uplink scheduling authorization) of the terminal, then, when the payload is the second payload, the random access response message includes the first terminal identifier, UL Grant and C-RNTI; when the payload is the first payload, the random access response message includes the first terminal identifier and UL Grant. Of course, the random access response message may or may not include other information, which is not limited by this embodiment.

At step 305, the access network device sends the random access response message to the terminal.

There are various ways of sending the random access response message, two of which are described below.

In the first sending method, if the payload is the first payload including the C-RNTI, the access network device scrambles Physical Downlink Control Channel (PDCCH) according to the C-RNTI, and the access network device transmits first indication information on the scrambled PDCCH, which is used for indicating the terminal to receive the random access response message.

The first indication information may be Downlink Control Information (DCI), which is used for indicating the terminal to demodulate the random access response message transmitted on the Physical Downlink Shared Channel (PDSCH) at the corresponding time-frequency resource location, and the random access response message is the second random access response message.

Scrambling the PDCCH means using the C-RNTI to scramble the Cyclic Redundancy Check (CRC) of the DCI transmitted on the PDCCH.

It should be noted that when the access network device scrambles the PDCCH according to C-RNTI, the first terminal identifier may also be excluded from the random access response message.

In the second sending method, the access network device calculates the RA-RNTI according to the first time-frequency resource; the access network device scrambles the PDCCH according to the RA-RNTI; and the access network equipment transmits second indication information on the scrambled PDCCH. The second indication information is used for indicating the terminal to receive the random access response message.

The second indication information may be the DCI, as described in the first sending method, and will not be repeated here.

It should be noted that the payload in the first sending method includes the C-RNTI, while the payload in the second sending method may not include the C-RNTI, i.e., whether the access network device sends the first random access response message including the C-RNTI or the second random access response message excluding the C-RNTI, the access network device can use the second sending method to send random access response messages.

At step 306, the terminal acquires the random access response message sent by the access network device.

In a first receiving method corresponding to the first sending method above, if the payload in the random access message is the first payload including the C-RNTI, the terminal descrambles the scrambled PDCCH according to the C-RNTI; if the descrambling of the scrambled PDCCH is successful, the terminal receives the random access response message according to the first indication information transmitted on the descrambled PDCCH.

If the C-RNTI has been stored in the terminal, the terminal may use the C-RNTI to descramble the CRC in the DCI transmitted on the scrambled PDCCH. If the CRC is successfully descrambled, the terminal determines that the scrambled PDCCH is successfully descrambled, and according to the indication of the DCI, it demodulates the random access response message transmitted on the PDSCH at the corresponding time-frequency resource location, where the random access response message is the second random access response message. If the descrambling of the CRC fails, the descrambling of the scrambled PDCCH is determined to have failed and the terminal determines that the random access has failed and re-initiates the random access.

In a second receiving method corresponding to the second sending method above, the terminal calculates RA-RNTI according to the first time-frequency resource; and the terminal descrambles the scrambled PDCCH according to the RA-RNTI. If the descrambling of the scrambled PDCCH is successful, the terminal receives the random access response message according to the second indication information transmitted on the descrambled PDCCH.

The terminal may use the RA-RNTI to descramble the CRC in the DCI transmitted on the scrambled PDCCH. If the CRC is successfully descrambled, the terminal determines that the scrambled PDCCH is successfully descrambled, and according to the indication of the DCI, it demodulates the random access response message transmitted on the PDSCH at the corresponding time-frequency resource location. If the descrambling of the CRC fails, the descrambling of the scrambled PDCCH is determined to have failed and the terminal determines that the random access has failed and re-initiates the random access the descrambling of the scrambled PDCCH is determined to have failed and the terminal determines that the random access has failed and re-initiates the random access.

At step 307, in response to the first terminal identifier in the random access response message being equal to a second terminal identifier of the terminal and the random access response message including the C-RNTI, the terminal determines to send an acknowledgement message to the access network device.

After receiving the random access response message, the terminal may read the first terminal identifier in the random access response message and compare whether the first terminal identifier is the same as the terminal's own second terminal identifier. If the first terminal identifier is the same as the second terminal identifier, the terminal determines that the random access is successful; if the first terminal identifier is different from the second terminal identifier, the terminal determines that the random access has failed and initiates random access again.

In this embodiment, when the terminal determines that the first terminal identifier is the same as the second terminal identifier, it also needs to determine whether to send the acknowledgement message to the access network device. If the random access response message includes the C-RNTI, the terminal determines to send the acknowledgement message to the access network device; if the random access response message does not include the C-RNTI, the terminal determines not to send the acknowledgement message to the access network device.

Optionally, the terminal may determine whether the acknowledgement message needs to be sent to the access network device by either of the following two determination methods.

In the first determination method, if the payload in the random access message is the second payload excluding the C-RNTI and the terminal determines that the random access response message includes the C-RNTI, the acknowledgement message needs to be sent to the access network device. If the payload in the random access message is the first payload including the C-RNTI and the terminal determines that the random access response message does not include the C-RNTI, no acknowledgement message is sent to the access network device.

In the second determination method, if the scrambled PDCCH is successfully descrambled according to the C-RNTI, the terminal determines that the C-RNTI is not included in the random access response message and does not send the acknowledgement message to the access network device.

At step 308, in response to the first terminal identifier in the random access response message being equal to the second terminal identifier of the terminal and the random access response message not including the C-RNTI, the terminal determines not to send the acknowledgement message to the access network device and the process ends.

The random access response message not including the C-RNTI indicates that the C-RNTI is already stored in the terminal and subsequent interaction with the access network device can be based on this C-RNTI.

Here, steps 301 and 303-305 can be implemented as separate embodiments on the access network device side and steps 302, 306-307 can be implemented as separate embodiments on the terminal side; alternatively, steps 301 and 303-305 can be implemented as separate embodiments on the access network device side and steps 302, 306 and 308 can be implemented as separate embodiments on the terminal side.

In summary, in the random access method provided by embodiments of present disclosure, since the terminal may send, according to the system message, the preamble in the random access message on the first time-frequency resource and the payload in the random access message on the second time-frequency resource, the merging of the messages sent by the terminal can be realized. The terminal may then receive the random access response message. When it is determined that the first terminal identifier in such random access response message is the same as the second terminal identifier of the terminal, the terminal may then determine whether to send the acknowledgement message depending on whether the C-RNTI is included in the random access response message, so that the integrity of the process of random access can be ensured.

When multiple terminals are in the RRC_connected state or RRC_inactive state, and these terminals send the same preamble on the same first time-frequency resource, C-RNTI can be used for distinguishing the different terminals, so that the conflicts generated by these terminals during random access can be resolved.

Figure 4:
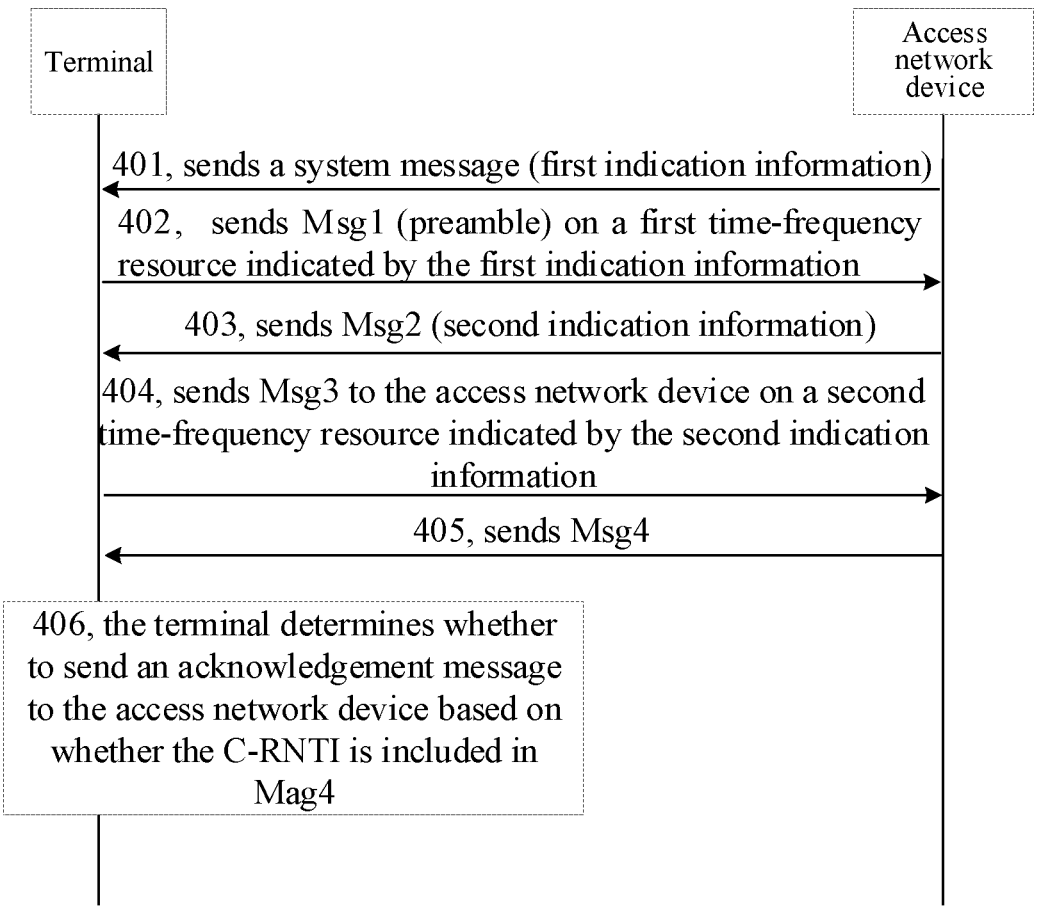
FIG. 4 is a flow chart of a random access method illustrated according to the related art.
Figure 5:
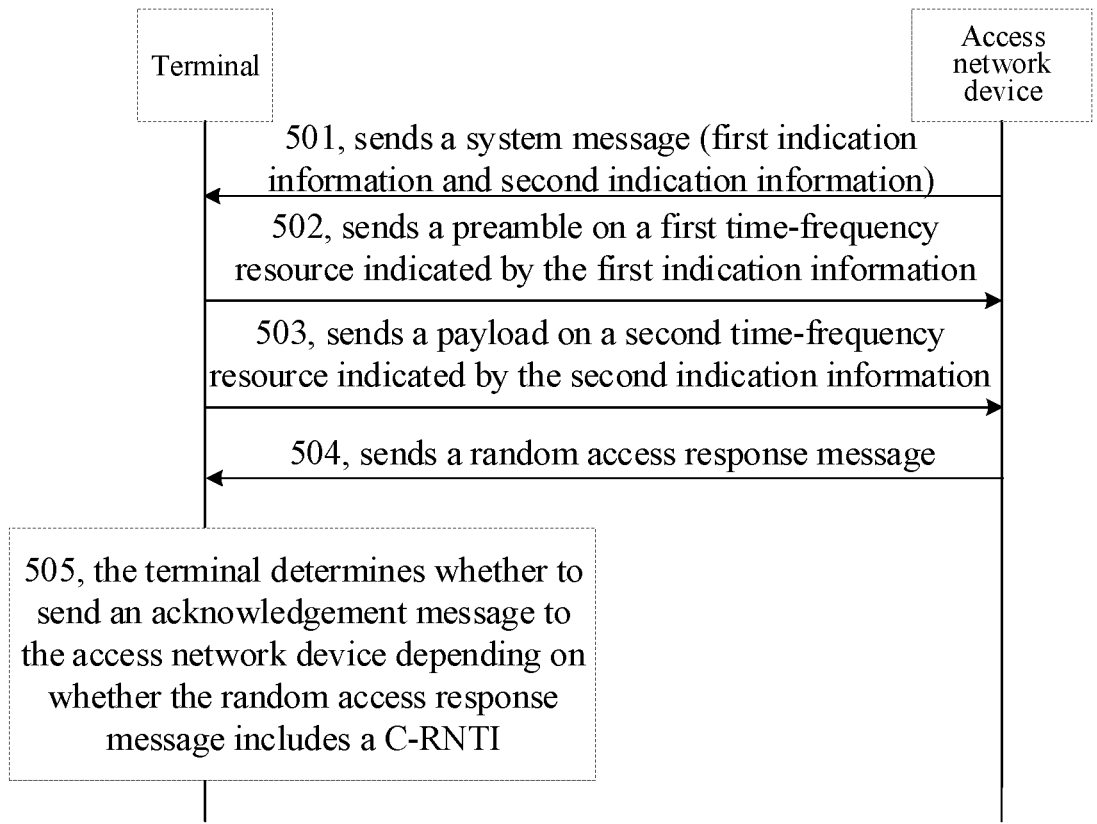
FIG. 5 is a flow chart of a random access method illustrated according to an embodiment.

The random access processes of the related art and an embodiment of present disclosure is illustrated below, FIG. 4 shows the random access process in the related art and FIG. 5 shows the random access process in the embodiment of present disclosure.

The random access process in the related art is as follows:

At step 401, the access network device sends a system message (first indication information) to the terminal.

At step 402, the terminal sends msg1 (preamble) to the access network device on a first time-frequency resource indicated by the first indication information.

At step 403, the access network device sends msg2 (second indication information) to the terminal.

At step 404, the terminal sends msg3 to the access network device on a second time-frequency resource indicated by the second indication information.

At step 405, the access network device sends msg4 to the terminal.

At step 406, the terminal determines whether to send an acknowledgement message to the access network device based on whether the C-RNTI is included in mag4.

The random access process in the embodiment of present disclosure is as follows.

At step 501, the access network device sends a system message (first indication information and second indication information) to the terminal.

At step 502, the terminal sends a preamble to the access network device on a first time-frequency resource indicated by the first indication information.

At step 503, the terminal sends a payload to the access network device on a second time-frequency resource indicated by the second indication information.

At step 504, the access network device sends a random access response message to the terminal.

At step 505, the terminal determines whether to send an acknowledgement message to the access network device depending on whether the random access response message includes a C-RNTI.

Figure 6:
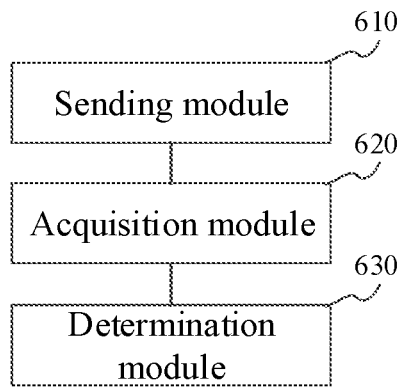
FIG. 6 is a block diagram of a random access apparatus illustrated according to an embodiment.

FIG. 6 is a block diagram of a random access apparatus according to an embodiment, which is applied to the terminal 102 shown in FIG. 1. As shown in FIG. 6, the random access apparatus includes a sending 610, an acquisition module 620 and a determination module 630.

The sending module 610 is configured to send, according to a system message sent by an access network device, a preamble in a random access message on a first time-frequency resource and a payload in the random access message on a second time-frequency resource.

The acquisition module 620 is configured to acquire a random access response message fed back by the access network device.

The determination module 630 is configured to determine, in response to a first terminal identifier in the random access response message being equal to a second terminal identifier of the terminal, whether to send an acknowledgement message to the access network device depending on whether the random access response message includes a C-RNTI, where the acknowledgement message is used for informing the access network device that the terminal has received the C-RNTI.

In an optional embodiment, the determination module 630 is further configured to: determine, in response to the random access response message including the C-RNTI, to send the acknowledgement message to the access network device; determine, in response to the random access response message excluding the C-RNTI, not to send the acknowledgement message to the access network device.

In an optional embodiment, the sending module 610 is further configured to: determine, according to a connection status of the terminal, whether the C-RNTI has been stored in the terminal; and generate, in response to the C-RNTI having been stored in the terminal, a first payload including the C-RNTI, and send the first payload of the random access message on the second time-frequency resource, where the first payload is used for informing the access network device that there is no need to allocate the C-RNTI to the terminal; generate, in response to the C-RNTI not being stored in the terminal, a second payload excluding the C-RNTI, and send the second payload of the random access message on the second time-frequency resource, where the second payload is used for informing the access network device to allocate the C-RNTI to the terminal.

In an optional embodiment, the sending module 610 is further configured to: determine, in response to the terminal being in a radio resource control connection (RRC_connected) status or a radio resource control inactive (RRC_inactive) status, that the C-RNTI has been stored in the terminal; determine, in response to the terminal being in a radio resource control idle (RRC_idle) status or an initial access status, that the terminal does not store the C-RNTI.

In an optional embodiment, in response to the payload in the random access message being a first payload comprising the C-RNTI, the acquisition module 620 is further configured to descramble a scrambled physical downlink control channel (PDCCH) according to the C-RNTI; and receive, in response to successful descrambling of the scrambled PDCCH, the random access response message according to first indication information transmitted on the descrambled PDCCH.

In an optional embodiment, the acquisition module is further configured to calculate a RA-RNTI according to the first time-frequency resource; descramble a scrambled PDCCH according to the RA-RNTI; and receive, in response to successful descrambling of the scrambled PDCCH, the random access response message according to second indication information transmitted on the descrambled PDCCH.

In summary, in the random access apparatus provided by embodiments of present disclosure, since the terminal may send, according to the system message, the preamble in the random access message on the first time-frequency resource and the payload in the random access message on the second time-frequency resource, the merging of the messages sent by the terminal can be realized. The terminal may then receive the random access response message. When it is determined that the first terminal identifier in such random access response message is the same as the second terminal identifier of the terminal, the terminal may then determine whether to send the acknowledgement message depending on whether the C-RNTI is included in the random access response message, so that the integrity of the process of random access can be ensured.

When multiple terminals are in the RRC_connected state or RRC_inactive state, and these terminals send the same preamble on the same first time-frequency resource, C-RNTI can be used for distinguishing the different terminals, so that the conflicts generated by these terminals during random access can be resolved.

Figure 7:
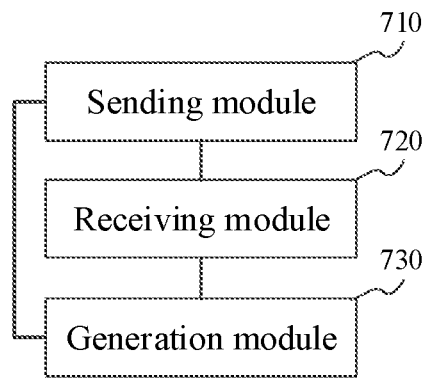
FIG. 7 is a block diagram of a random access apparatus illustrated according to an embodiment.

FIG. 7 is a block diagram of a random access apparatus according to an embodiment, which is applied to the network access device 101 shown in FIG. 1. As shown in FIG. 7, the random access apparatus includes a sending module 710, a receiving module 720, and a generation module 730.

The sending module 710 is configured to send a system message to a terminal, where the system message is used for indicating the terminal to send a preamble in a random access message on a first time-frequency resource and to send a payload in the random access message on a second time-frequency resource.

The receiving module 720 is configured to receive the preamble on the first time-frequency resource and the payload on the second time-frequency resource.

The generation module 730 is configured to generate a random access response message according to whether the payload carries a C-RNTI, where the random access response message includes a first terminal identifier, or the random access response message includes the first terminal identifier and the C-RNTI.

In an optional embodiment, the generation module 730 is further configured to allocate, in response to the payload of the random access message being a second payload excluding the C-RNTI, the C-RNTI to the terminal, and generate a first random access response message including the C-RNTI, where the first random access response message serves as the random access response message; generate, in response to the payload of the random access message being a first payload including the C-RNTI, a second random access response message excluding the C-RNTI, where the second random access response message serves as the random access response message.

Figure 8:
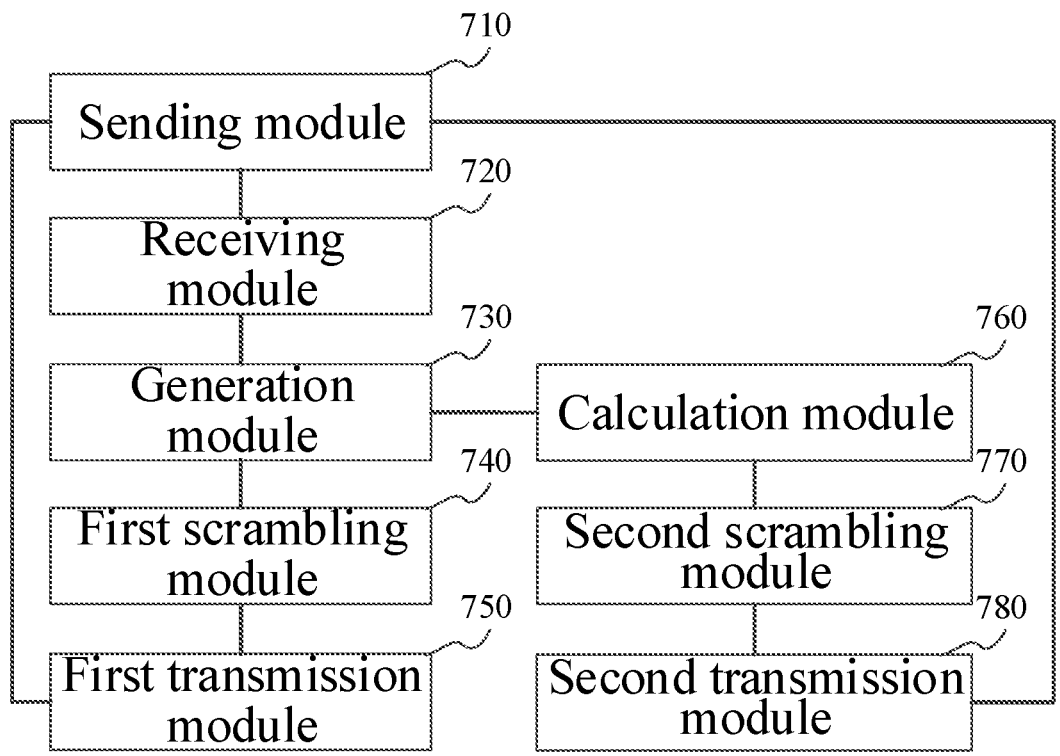
FIG. 8 is a block diagram of a random access apparatus illustrated according to an embodiment.

Referring to FIG. 8, in an optional embodiment, in response to the payload being a first payload comprising the C-RNTI, the apparatus further includes a first scrambling module 740 configured to scramble a physical downlink control channel (PDCCH) according to the C-RNTI; and a first transmission module 750 configured to transmit first indication information on the PDCCH scrambled by the first scrambling module, where the first indication information is used for indicating the terminal to receive the random access response message.

In an optional embodiment, the apparatus further includes a calculation module 760, a second scrambling module 770, and a second transmission module 780.

The calculation module 760 is configured to calculate a RA-RNTI according to the first time-frequency resource.

The second scrambling module 770 is configured to scramble a PDCCH according to the RA-RNTI.

The second transmission module 780 is configured to transmit second indication information on the PDCCH scrambled by the second scrambling module, where the second indication information is used for indicating the terminal to receive the random access response message.

In summary, in the random access apparatus provided by embodiments of present disclosure, since the access network device may send the system message to the terminal and receive the preamble in the random access message on the first time-frequency resource and the payload in the random access message on the second time-frequency resource, the merging of the messages sent by the terminal can be realized. The access network device may then send the random access response message to the terminal. When the terminal determines that the first terminal identifier in such random access response message is the same as the second terminal identifier of the terminal, the terminal may determine whether to send the acknowledgement message depending on whether the C-RNTI is included in the random access response message, so that the integrity of the process of random access can be ensured.

When multiple terminals are in the RRC_connected state or RRC_inactive state, and these terminals send the same preamble on the same first time-frequency resource, C-RNTI can be used for distinguishing the different terminals, so that the conflicts generated by these terminals during random access can be resolved.

An embodiment of the present disclosure provides a terminal capable of implementing the random access method provided in the present disclosure. The terminal includes one or more processors; and a memory for storing one or more executable instructions of the one or more processors. The one or more processors are configured to send, according to a system message sent by an access network device, a preamble in a random access message on a first time-frequency resource and a payload in the random access message on a second time-frequency resource; acquire a random access response message fed back by the access network device; and determine, in response to a first terminal identifier in the random access response message being equal to a second terminal identifier of the terminal, whether to send an acknowledgement message to the access network device depending on whether the random access response message includes a C-RNTI, where the acknowledgement message is used for informing the access network device that the terminal has received the C-RNTI.

An embodiment of the present disclosure provides an access network device capable of implementing the random access method provided in the present disclosure. The access network device includes one or more processors; and a memory for storing one or more executable instructions of the one or more processors. The one or more processors are configured to send a system message to a terminal, where the system message is used for indicating the terminal to send a preamble in a random access message on a first time-frequency resource and to send a payload in the random access message on a second time-frequency resource; receive the preamble on the first time-frequency resource and the payload on the second time-frequency resource; and generate a random access response message according to whether the payload carries a C-RNTI, where the random access response message includes a first terminal identifier, or the random access response message includes the first terminal identifier and the C-RNTI.

Figure 9:
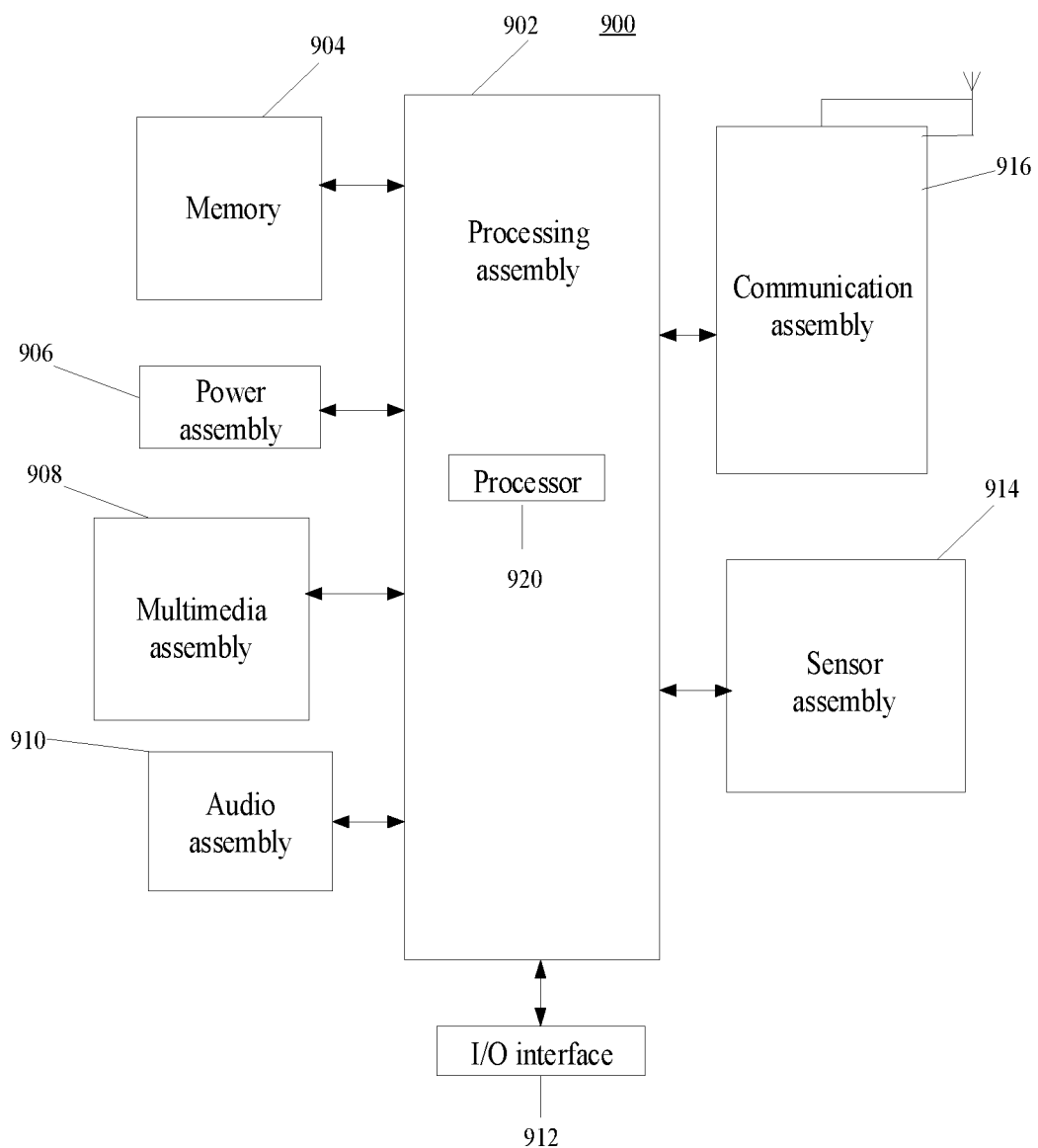
FIG. 9 is a block diagram of a device for random access illustrated according to an embodiment.

FIG. 9 is a block diagram of a device 900 for random access according to an embodiment. For example, the device 900 may be a mobile phone, a computer, a digital broadcasting terminal, a messaging device, a gaming console, a tablet device, a medical device, a fitness device, a personal digital assistant, etc.

Referring to FIG. 9, the device 900 may include one or more of the following assemblies: a processing assembly 902, a memory 904, a power assembly 906, a multimedia assembly 908, an audio assembly 910, an input/output (I/O) interface 912, a sensor assembly 914, and a communication assembly 916. calls, data communications, camera operations and recording operations.

The processing assembly 902 typically controls the overall operation of the device 900, such as operations associated with display, telephone calls, data communication, camera operation and recording operations. The processing assembly 902 may include one or more processors 920 to execute instructions to complete all or some of the steps of the method described above. In addition, the processing assembly 902 may include one or more modules that facilitate interaction between the processing assembly 902 and other assemblies. For example, the processing assembly 902 may include a multimedia module to facilitate interaction between the multimedia assembly 908 and the processing assembly 902.

The memory 904 is configured to store various types of data to support operation at the device 900. Examples of such data include instructions for any application or method of operation on the device 900, contact data, phonebook data, messages, pictures, videos, etc. The memory 904 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or CD-ROM.

The power assembly 906 provides power to the various assemblies of the device 900. The power assembly 906 may include a power management system, one or more power supplies, and other components associated with generating, managing, and distributing power for device 900.

The multimedia assembly 908 includes a screen providing an output interface between the device 900 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some embodiments, the multimedia assembly 908 includes a front camera and or a rear camera. The front camera and/or rear camera can receive external multimedia data when the device 900 is in an operating mode, such as shooting mode or video mode. Each front camera and rear camera may be a fixed optical lens system or have focal length and optical zoom capability.

The audio assembly 910 is configured to output and/or input audio signals. For example, the audio assembly 910 includes a microphone (MIC) configured to receive external audio signals when the device 900 is in an operating mode, such as call mode, recording mode and voice recognition mode. The received audio signal may be further stored in memory 904 or sent via communication assembly 916. In some embodiments, the audio assembly 910 also comprises a speaker for outputting the audio signal.

The I/O interface 912 provides an interface between the processing assembly 902 and a peripheral interface module, which may be a keypad, click wheel, button, etc. These buttons may include, but are not limited to: home button, volume button, start button and lock button.

The sensor assembly 914 includes one or more sensors for providing status assessment of various aspects of the device 900. For example, sensor assembly 914 may detect an open/closed state of device 900, the relative positioning of a component, such as the component being the display and keypad of device 900, sensor assembly 914 may also detect a change in the position of device 900 or a component of device 900, the presence or absence of user contact with device 900, the orientation of device 900 or acceleration/deceleration and a change in the temperature of device 900. The sensor assembly 914 may include a proximity sensor configured to detect the presence of nearby objects in the absence of any physical contact. The sensor assembly 914 may also include a light sensor, such as a CMOS or CCD image sensor, for use in imaging applications. In some embodiments, the sensor assembly 914 may also include an accelerometer sensor, gyroscope sensor, magnetic sensor, pressure sensor, or temperature sensor.

The communication assembly 916 is configured to facilitate communication between the device 900 and other devices by wired or wireless means. The device 900 may have access to a wireless network based on communication standards such as WiFi, 2G or 3G, or a combination thereof. In one embodiment, communication assembly 916 receives broadcast signals or broadcast-related information from an external broadcast management system via a broadcast channel. In an embodiment, the communication assembly 916 further includes a near field communication (NFC) module to facilitate short range communication.

In embodiments, the device 900 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components for performing the method described above.

In embodiments, there is also provided a non-transitory computer readable storage medium including instructions, such as memory 904 including instructions, the instructions being executable by processor 920 of device 900 to accomplish the method described above. For example, the non-transitory computer readable storage medium may be ROM, random access memory (RAM), CD-ROM, magnetic tape, floppy disks and optical data storage devices, among others.

A non-transitory computer-readable storage medium that enables the mobile terminal to perform the random access method described above when the instructions in the storage medium are executed by the processor of the mobile terminal.

Figure 10:
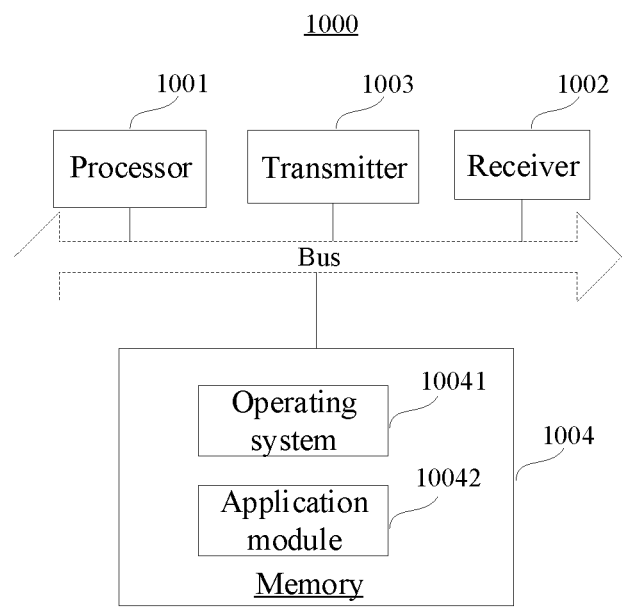
FIG. 10 is a block diagram of a random access device illustrated according to an embodiment.

FIG. 10 is a block diagram of a random access device 1000 according to an embodiment. For example, the random access device 1000 may be an access network device. As shown in FIG. 10, the random access device 1000 may include: a processor 1001, a receiver 1002, a transmitter 1003 and a memory 1004, with the receiver 1002, the transmitter 1003 and the memory 1004 each being connected to the processor 1001 via a bus.

Here, the processor 1001 includes one or more processing cores, the processor 1001 is used to execute the method performed by the access network device in the random access method provided by embodiments of the present disclosure by running software programs as well as modules. The memory 1004 may be used to store the software programs and modules. Specifically, memory 1004 may store operating system 10041, application modules 10042 required for at least one function. The receiver 1002 is used to receive communication data sent by other devices, and transmitter 1003 is used to send communication data to other devices.

Figure 11:
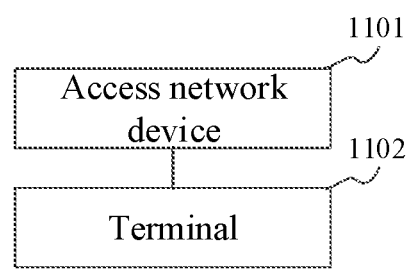
FIG. 11 is a block diagram of a random access system illustrated according to an embodiment.

FIG. 11 is a block diagram of a random access system illustrated according to an embodiment. As shown in FIG. 11, the random access system includes an access network device 1101 and a terminal 1102.

The access network device 1101 is used to perform the random access method performed by the access network device in the embodiments shown in FIGS. 2 to 5.

The terminal 1102 is used to perform the random access method performed by the terminal in the embodiments shown in FIGS. 2 to 5.

An embodiment of the present disclosure provides a computer readable storage medium. The storage medium stores at least one instruction, at least one program, a code set or a set of instructions, where the at least one instruction, the at least one program, the code set or set of instructions is loaded and executed by the processor to implement a random access method as described above.

A person skilled in the art will readily anticipate other embodiments of the present disclosure upon consideration of the specification and the disclosure herein in practice. This application is intended to cover any variations, uses or adaptations of this disclosure, which follow the general principles of this disclosure and include common knowledge or customary technical means in this technical field that are not disclosed in this disclosure. And the true scope and spirit of the present disclosure is indicated by the following claims.

It should be understood that the present disclosure is not limited to the precise construction already described above and illustrated in the accompanying drawings, and that various modifications and changes may be made without departing from its scope.

What is claimed is:

1. A method for random access, comprising:
sending, by a terminal, according to a system message sent by an access network device, a preamble in a random access message on a first time-frequency resource and a payload in the random access message on a second time-frequency resource, wherein the system message includes first resource indication information and second resource indication information, the first resource indication information is used for indicating to the terminal the first time-frequency resource for sending the preamble in the random access message, and the second resource indication information is used for indicating to the terminal the second time-frequency resource for sending the payload in the random access message; wherein sending the payload in the random access message on the second time-frequency resource, comprises:
determining, in response to the terminal being in a radio resource control connection (RRC_connected) status or a radio resource control inactive (RRC_inactive) status, that a Cell Radio Network Temporary Identifier (C-RNTI) has been stored in the terminal, generating, by the terminal, a first payload comprising the C-RNTI, and sending to the access network device the first payload of the random access message on the second time-frequency resource, wherein the first payload is configured to inform the access network device that there is no need to allocate the C-RNTI to the terminal; and
determining, in response to the terminal being in a radio resource control idle (RRC_idle) status or an initial access status, that the terminal does not store the C-RNTI, generating, by the terminal, a second payload excluding the C-RNTI, and sending to the access network device the second payload of the random access message on the second time-frequency resource, wherein the second payload is configured to inform the access network device to allocate the C-RNTI to the terminal;
acquiring, by the terminal, a random access response message fed back by the access network device, wherein, when the terminal sends the second payload excluding the C-RNTI to the access network device, the random access response message acquired is a first random access response message comprising the C-RNTI; when the terminal sends the first payload comprising the C-RNTI to the access network device, the random access response message acquired is a second random access response message excluding the C-RNTI; and
determining, in response to a first terminal identifier in the random access response message being equal to a second terminal identifier of the terminal, whether to send an acknowledgement message to the access network device depending on whether the random access response message comprises the C-RNTI, wherein the acknowledgement message informs the access network device that the terminal has received the C-RNTI, wherein determining whether to send the acknowledgement message to the access network device depending on whether the random access response message comprises the C-RNTI, comprises:
   determining, by the terminal, in response to the random access response message being the first random access response message comprising the C-RNTI, to send the acknowledgement message to the access network device;
   determining, by the terminal, in response to the random access response message being the second random access response message excluding the C-RNTI, not to send the acknowledgement message to the access network device;
wherein in response to the payload in the random access message being the first payload comprising the C-RNTI, the terminal acquiring the random access response message fed back by the access network device comprises:
descrambling, by the terminal, a scrambled physical downlink control channel (PDCCH) according to the C-RNTI, wherein the scrambled PDCCH is scrambled by the access network device according to the C-RNTI; and
receiving, in response to successful descrambling of the scrambled PDCCH, by the terminal, the random access response message according to first indication information transmitted on the descrambled PDCCH.

2. A method for random access, comprising:
sending, by an access network device, a system message to a terminal, wherein the system message includes first resource indication information and second resource indication information, the first resource indication information is used for indicating to the terminal a first time-frequency resource for sending a preamble in a random access message, and the second resource indication information is used for indicating to the terminal a second time-frequency resource for sending a payload in the random access message;
receiving, by the access network device, the preamble on the first time-frequency resource, and receiving the payload on the second time-frequency resource, wherein receiving the payload on the second time-frequency resource comprises:
   in response to the terminal being in a radio resource control connection RRC_connected) status or a radio resource control inactive (RRC_inactive) status, receiving a first payload comprising a Cell Radio Network Temporary Identifier (C-RNTI) on the second time-frequency resource, wherein the C-RNTI has been stored in the terminal and the first payload is configured to inform the access network device that there is no need to allocate the C-RNTI to the terminal;
   in response to the terminal being in a radio resource control idle (RRC_idle) status or an initial access status, receiving a second payload excluding the C-RNTI on the second time-frequency resource, wherein the terminal does not store the C-RNTI, and the second payload is configured to inform the access network device to allocate the C-RNTI to the terminal; and
generating, by the access network device, a random access response message according to whether the payload carries the C-RNTI, wherein
   the random access response message comprises a first terminal identifier used for the terminal to determine whether the first terminal identifier is equal to a second terminal identifier of the terminal, or
   the random access response message comprises the first terminal identifier and the C-RNTI;
wherein, when the random access response message comprises the first terminal identifier and the C-RNTI, the method further comprises:
receiving, by the access network device, an acknowledgement message from the terminal, wherein the acknowledgement message informs the access network device that the terminal has received the C-RNTI;
wherein the access network device generating the random access response message according to whether the payload carries the C-RNTI, comprises:
allocating, in response to the payload of the random access message being the second payload excluding the C-RNTI, by the access network device, the C-RNTI to the terminal, and generating a first random access response message comprising the C-RNTI, wherein the first random access response message serves as the random access response message; and
generating, in response to the payload of the random access message being the first payload comprising the C-RNTI, by the access network device, a second random access response message excluding the C-RNTI, wherein the second random access response message serves as the random access response message; and
wherein in response to the payload being the first payload comprising the C-RNTI, the method further comprises:
   scrambling, by the access network device, a physical downlink control channel (PDCCH) according to the C-RNTI; and
   transmitting, by the access network device, first indication information on the scrambled PDCCH, wherein the first indication information is used for indicating the terminal to receive the random access response message.

3. A terminal, comprising:
one or more processors; and
a memory for storing one or more executable instructions of the one or more processors, wherein the one or more processors are configured to:
   send, according to a system message sent by an access network device, a preamble in a random access message on a first time-frequency resource and a payload in the random access message on a second time-frequency resource, wherein the system message includes first resource indication information and second resource indication information, the first resource indication information is used for indicating to the terminal the first time-frequency resource for sending the preamble in the random access message, and the second resource indication information is used for indicating to the terminal the second time-frequency resource for sending the payload in the random access message;
   acquire a random access response message fed back by the access network device, wherein, when the terminal sends a second payload excluding a Cell Radio Network Temporary Identifier (C-RNTI) to the access network device, the random access response message acquired is a first random access response message comprising the C-RNTI; when the terminal sends a first payload comprising the C-RNTI to the access network device, the random access response message acquired is a second random access response message excluding the C-RNTI; and determine, in response to a first terminal identifier in the random access response message being equal to a second terminal identifier of the terminal, whether to send an acknowledgement message to the access network device depending on whether the random access response message comprises the C-RNTI, wherein the acknowledgement message informs the access network device that the terminal has received the C-RNTI;

wherein the one or more processors are further configured to:

determine, in response to the terminal being in a radio resource control connection (RRC_connected) status or a radio resource control inactive (RRC_inactive) status, that the C-RNTI has been stored in the terminal, generate the first payload comprising the C-RNTI, and send to the access network device the first payload of the random access message on the second time-frequency resource, wherein the first payload is configured to inform the access network device that there is no need to allocate the C-RNTI to the terminal;

determine, in response to the terminal being in a radio resource control idle (RRC_idle) status or an initial access status, that the terminal does not store the C-RNTI, generate the second payload excluding the C-RNTI, and send to the access network device the second payload of the random access message on the second time-frequency resource, wherein the second payload is configured to inform the access network device to allocate the C-RNTI to the terminal;

wherein, in response to the payload in the random access message being the first payload comprising the C-RNTI, the one or more processors are further configured to:

descramble a scrambled physical downlink control channel (PDCCH) according to the C-RNTI, wherein the scrambled PDCCH is scrambled by the access network device according to the C-RNTI; and receive, in response to successful descrambling of the scrambled PDCCH, the random access response message according to first indication information transmitted on the descrambled PDCCH; and wherein the one or more processors are further configured to:

determine, in response to the random access response message being the first random access response comprising the C-RNTI, to send the acknowledgement message to the access network device;

determining, in response to the random access response message being the second random access response excluding the C-RNTI, not to send the acknowledgement message to the access network device.

4. An access network device, comprising:

one or more processors; and a memory for storing one or more executable instructions of the one or more processors, wherein the one or more processors are configured to implement the random access method of claim 2.

* * * * *